United States Patent
Oh et al.

(10) Patent No.: US 7,566,135 B2
(45) Date of Patent: Jul. 28, 2009

(54) LIGHT TUNNEL OF DLP PROJECTION SYSTEM

(75) Inventors: Nam Seok Oh, Gumi-shi (KR); Sang Min Oh, Busan-si (KR); Jin Dong Yeo, Daegu-si (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 11/289,416

(22) Filed: Nov. 30, 2005

(65) Prior Publication Data
US 2006/0152689 A1 Jul. 13, 2006

(30) Foreign Application Priority Data

| | | |
|---|---|---|
| Jan. 13, 2005 | (KR) | 10-2005-0003124 |
| May 6, 2005 | (KR) | 10-2005-0038170 |
| May 10, 2005 | (KR) | 10-2005-0038824 |

(51) Int. Cl.
*G03B 21/28* (2006.01)
*G03B 21/14* (2006.01)

(52) U.S. Cl. .......................... 353/99; 353/20
(58) Field of Classification Search ............... 353/20, 353/28, 97, 102, 119; 348/771; 349/58, 349/61–63; 362/559–561, 580–582
See application file for complete search history.

(56) References Cited

U.S. PATENT DOCUMENTS

| | | | | |
|---|---|---|---|---|
| 6,364,493 B1 * | 4/2002 | Kakuta et al. | ............... | 353/122 |
| 6,422,719 B1 | 7/2002 | Hung et al. | | |
| 6,926,413 B2 * | 8/2005 | Akiyama | ............... | 353/122 |
| 7,004,586 B2 * | 2/2006 | Morinaga | ............... | 353/20 |
| 2003/0053787 A1 | 3/2003 | Lee | | |
| 2003/0098956 A1 * | 5/2003 | Chang et al. | ............... | 353/52 |
| 2004/0062043 A1 | 4/2004 | Vastola et al. | | |
| 2004/0090598 A1 | 5/2004 | Morinaga | | |
| 2005/0111818 A1 * | 5/2005 | Wang et al. | ............... | 385/147 |

FOREIGN PATENT DOCUMENTS

| | | |
|---|---|---|
| CN | 1410829 | 4/2003 |
| CN | 1469190 | 1/2004 |
| JP | 2000-043603 | 2/2000 |
| KR | 20-0187157 | 7/1999 |
| KR | 20-0187156 | 7/2000 |
| KR | 10-2000-0060358 A | 10/2000 |
| KR | 10-2003-0036105 A | 5/2003 |

OTHER PUBLICATIONS

Chinese Office Action dated Jul. 27, 2007.
Korean Office Action dated Sep. 27, 2006.
Korean Office Action dated Oct. 27, 2006.
Chinese Office Action dated Sep. 23, 2008.
European Search Report dated Oct. 6, 2008.

* cited by examiner

*Primary Examiner*—Hung Henry Nguyen
(74) *Attorney, Agent, or Firm*—Ked & Associates, LLP (57) ABSTRACT

In order to provide a light transmitting space to reinforce an intensity of a light tunnel in a DLP projection system, and increase an heat-resistance, provided is a light tunnel of a DLP projection system including a plurality of reflection panels provided in an anteroposterior direction; a holder where the reflection panel is placed; a first supporting member supporting an end of the reflection panel; and a second supporting member supporting a body of the reflection panel.

11 Claims, 12 Drawing Sheets

LIGHT TUNNEL OF DLP PROJECTION SYSTEM

BACKGROUND OF THE INVENTION

1. Field of the Invention

The present invention relates to a light tunnel of a digital light processing DLP projection system of which an operational reliability is improved, and more particularly, to a light tunnel of a Digital Light Processing (DLP) projection system to improve a radiative capability in a light tunnel where a large amount of lights are impinged at a state that a plurality of reflection panels are connected and its structure is firmly supported.

2. Description of the Related Art

As a method for realizing a high quality image is realized using a device reflecting a light in a Digital Light Processing (DLP) projection system, the present invention relates to a device displaying an image of a high brightness and a high resolution by selectively reflecting a light in a device where hundreds of thousands of reflection device are integrated in one chip.

The DLP method projection system is a digital device deciding a shielding/opening of a light reflected on a surface of a large amount of minute digital micromirror devices DMD using a control circuit. Therefore, a noise or an image quality is not degraded when a digital signal is changed into an analogue signal, and an original image can be perfectly realized. In addition, a device has a rapid response speed in comparison with LCD and PDP methods, and moving images can be realized more softly and supply, resulting in accepting many viewers due to a view angle. Moreover, the system is manufactured by a simple method which is not effected by the electric fields and the system is easily controlled to be adjusted in both directions of the front and the rear projections.

For a brief description of the configuration of a DLP projection system, the DLP system comprises: a lamp irradiating a light, an integrator changing the light generated from the lamp into a uniform surface light source in the lamp, a color wheel for dividing a white light transmitted through the integrator into three colors Red Green Blue, a condensing lens concentrating a light transmitted from the color wheel, a prism reflecting the light transmitted through the condensing lens, a DMD reflecting the reflected light to the prism and a lens enlarging the light reflected in the DMD.

The integrator may make the light irradiated from the lamp be formed to a uniform surface light source. The integrator may be manufactured by a method in which mirrors are connected with each other on a plurality of the inner surfaces of an empty square pillar shape. The integrator may change a surface light by a light transmitted through the inside, and therefore it may be called a light tunnel or a light load. Hereafter, an integrator is called a 'light tunnel'. In addition, as the light tunnel gets longer, the number of diffused reflection/refraction of a light irradiated from the lamp increases. Therefore, a light emitted from a light tunnel becomes uniform to become close to a surface light.

The light tunnel generates a heat according to a characteristic that a large amount of lights are received to be transmitted. If a cooling of the heat is not smoothly performed, there occurs a problem degrading an operational reliability of a light tunnel.

A plurality of reflection panels are connected with each other and may create a problem of collapsing a light tunnel in a case that a connecting portion between a fixed light tunnel and a reflection panel is melted by a heat, a problem of a reflection angle of a reflection panel becomes inferior in case that a connecting force between the reflection panels by a heat is decreased to be out of the original position, and a problem that degrades a capability for forming a surface light in a light tunnel. A uniformity of a light surface is degraded due to the formal failures of a light tunnel and an image quality is degraded, if a capacity of a surface light is deteriorated.

SUMMARY OF THE INVENTION

In order to improve the above problems, it is an object of the present invention to provide with a light tunnel of a DLP projection system preventing an image from being degraded by firmly supporting a light tunnel.

It is another object of the present invention to provide with a light tunnel of a DLP projection system where uniformity of a surface light transmitted through the light tunnel is obtained by maintaining the shape provided at the time of manufacture.

It is another object of the present invention to provide with a light tunnel of a DLP projection system preventing a failure of products in order not to collapse a light tunnel even if the time for using a DLP projection system is increased.

In order to obtain the objects, a light tunnel of a DLP projection system according to the present invention comprises: a plurality of reflection panels provided long in an anteroposterior direction to provide the inside with a light transmitting space; a holder where the reflection panel is placed; a first supporting member supporting an end of the reflection panel; and a second supporting member supporting a body of the reflection panel.

A light tunnel of a DLP projection system in accordance with another aspect of the present invention comprises: a plurality of reflection panels connected with each other; a holder where the reflection panel is reached; an incidence portion to which a light is received through the inside of the reflection panel; an emitting portion to which a light is emitted after being reflected by the reflection tunnel; and a plate spring elastically supporting some of a plurality of reflection panels.

In accordance with another aspect of the present invention, a light tunnel of a DLP projection system comprises: a plurality of reflection panels connected with each other; a third supporting member provided to a contact portion with the reflection panel; a holder through which the reflection panel is inserted; an incidence portion receiving a light inside of the reflection panel; an emitting portion emitting a light after being reflected by the reflection panel; a first supporting member supporting the incidence portion and/or an emitting portion; and a second supporting member supporting a body of the reflection panel.

As described above, the present invention provides with an advantage that a uniform and stable surface light source, because a light tunnel can be manufactured more firmly than a light tunnel in the present invention.

In addition, it is advantageous that an image quality is improved because a uniform surface light is secured.

Moreover, a light tunnel is manufactured more stably and a failure of the products can be possible. The products can be used for longer period.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

THE FIRST EMBODIMENT

Figure 1:
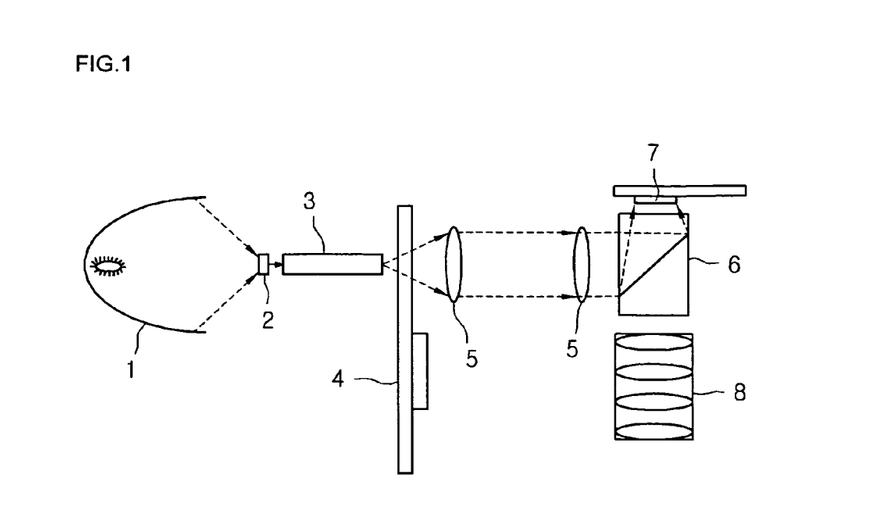
FIG. 1 is a configurational view describing a structure of a DLP projection system in accordance with the present invention.
Figure 2:
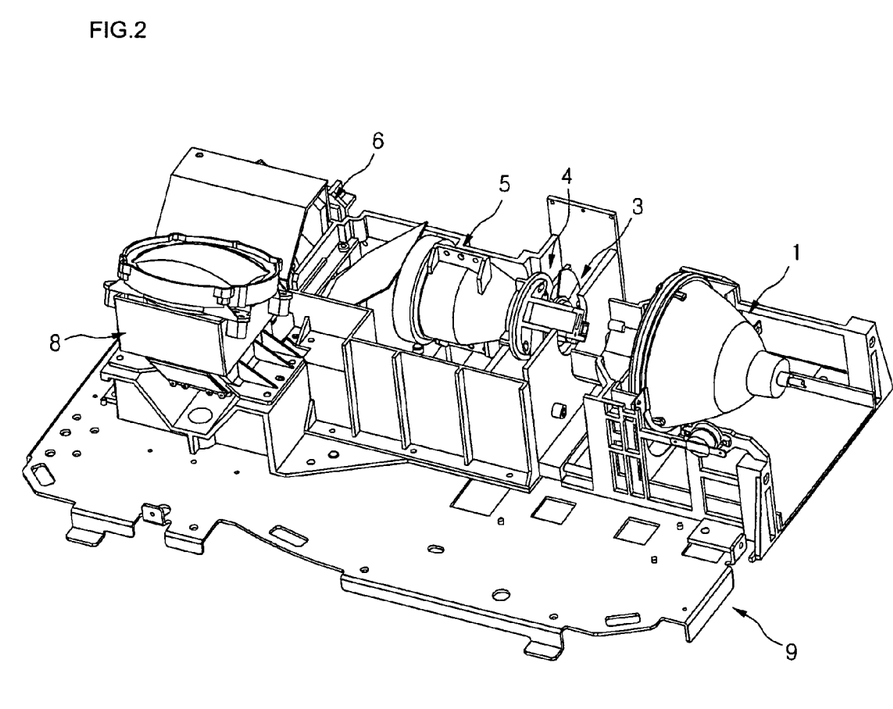
FIG. 2 is a perspective view of an optical engine in a DLP projection system in accordance with the present invention.

FIG. 1 is a configurational view describing a structure of a Digital Light Processing (DLP) projection system in accordance with the present invention, and FIG. 2 is a perspective view of an optical engine in a DLP projection system in accordance with the present invention.

Referring to FIGS. 1 and 2, the DLP projection system comprises: a lamp 1 generating a light, a light tunnel portion 3 through which a light generated from the lamp 1 is transmitted; a color wheel 4 where a white light transmitted through the light tunnel portion 3 is divided into RGB; a condensing lens 5 concentrating a light passing through the color wheel 4; a prism 6 where a light passing through the condensing lens 5 is reflected; a DMD 7 focusing a light reflected on the prism 6 to the screen; and a projection lens 8 enlarging a light reflected from the DMD 7. Especially, the light tunnel portion 3 is formed to transmit a light generated from the lamp 1 to have a uniform surface light source. However, since the strong light generated from the lamp 1 includes an ultraviolet ray and affects the light tunnel portion 3, an ultraviolet ray is filtered out by the ultraviolet ray filter 2 before the light is impinged by the light tunnel portion 3.

In addition, the light tunnel portion 3 has a mirror as a reflection panel having a reflection plate at the inner sides of a hollow square pillar shape, and a light impinged from the lamp 1 made to a uniform surface light source to irradiate a color wheel 4.

Furthermore, the light tunnel portion 3 consists of a holder with a predetermined shape (refer to 33 in FIG. 3), a plurality of mirrors placed in the holder 33 and a plurality of supporting members supporting the mirrors. The holder 33 is provided with a groove drilled inwardly so that a plurality of mirrors are positioned to have a relatively specific structure, and the supporting member makes that relative positions of a mirror can be supported each other. Here, an inner portion of a light tunnel provided by the mirror is called a reflection panel.

In detail, the supporting member can be classified in accordance with a position supporting a reflection panel, a shape and a method, and comprises: a first supporting member provided to an end of a reflection panel extended long in accordance with a proceeding direction of a light to fix a relative position of a plurality of reflection panels; a second supporting member supporting a body portion of the reflection panel to fix a relative position of the reflection panel; and a third supporting member connecting contact portions of the relative reflection panel to relatively fix. The below mentioned various embodiments may be modified into various shapes in accordance with the various methods employing the supporting members.

The first embodiment of the present invention is focused on seizing a body portion of a reflection to improve a structure of a second supporting member fixing a relative position of a reflection panel.

Figure 3:
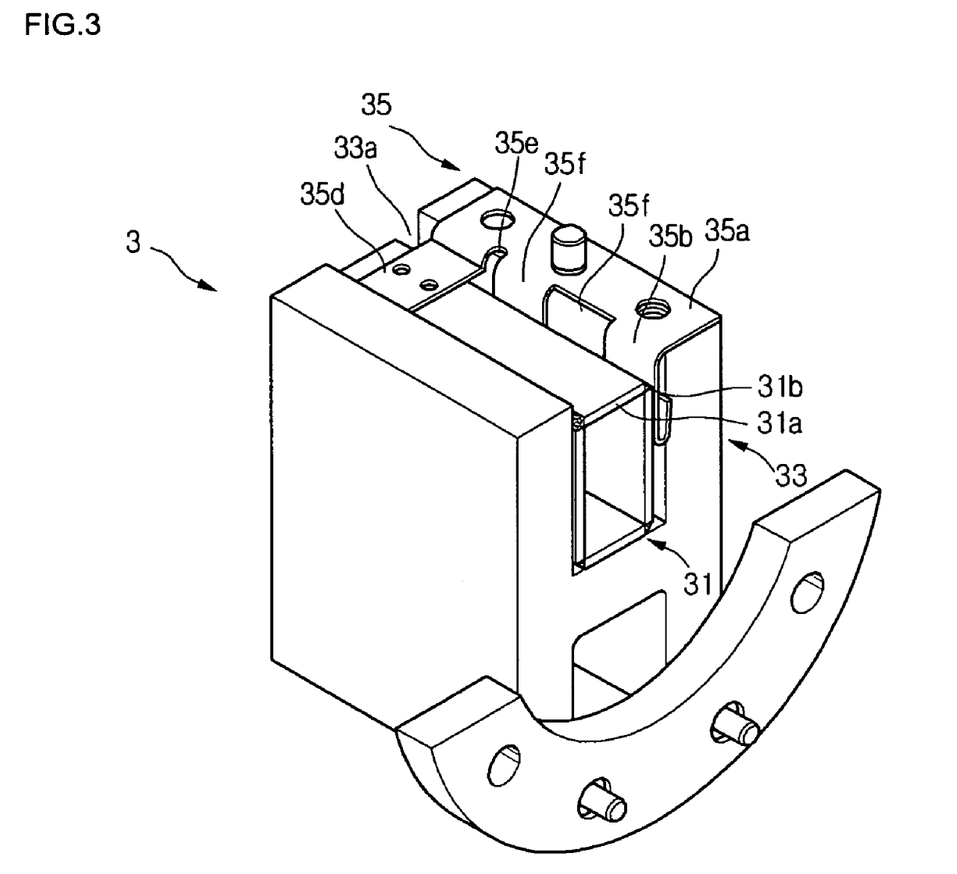
FIG. 3 is an underbody perspective view of a light tunnel portion in accordance with the present invention.
Figure 4:
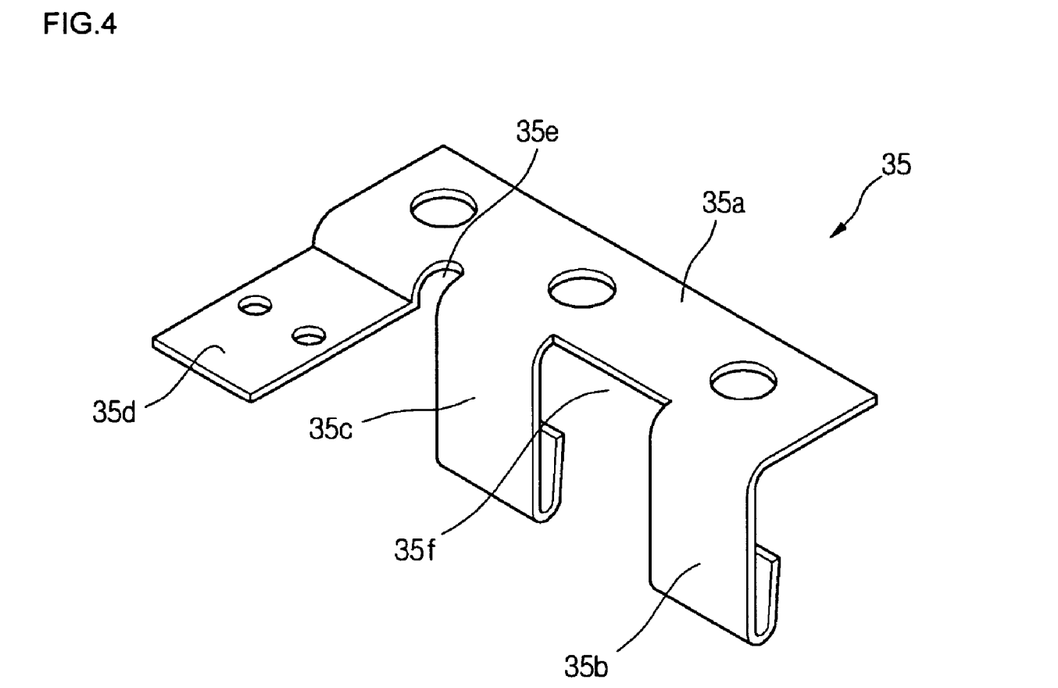
FIG. 4 is a perspective view showing a plate spring structure supporting a light tunnel in accordance with the present invention.

FIG. 3 is an underbody perspective view of a light tunnel portion in accordance with the present invention, and FIG. 4 is a perspective view showing a plate spring structure for supporting a light tunnel in accordance with the present invention.

Referring to FIGS. 3 and 4, the light tunnel portion 3 consists of a light tunnel 31, a holder 33 and a plate spring 35. The light tunnel 31 is manufactured to have an empty square pillar with four reflection panels 31a provided with a mirror, and forms an uniform surface light source such that a light impinged from a lamp 1 is reflected/refracted by a reflection panel.

It is desirable that both ends are supported by the bonding portion 31b, more particularly, it is desirable that an end and the other end are crossed to form a bonding portion 31b so that a lamp light transmitting through the light tunnel 31 is not let out through an opening generated at the ends of the reflection panel 31a.

The holder 33 forms a "U" shaped-insertion groove 33a so that the light tunnel 31 is inserted, and is installed to an optic engine base of a DLP projection system. (Refer to 9 in FIG. 2)

The plate spring 35 is configured to be fixed to an upper side of the holder 33 to pressurize both the side surface and the upper surface of the light tunnel 31 in the insertion hole 33a, and the detailed configuration is as below.

The plate spring 35 comprises: a holder fixing portion 35a connected with an upper end of a side of the reflection panel insertion hole 33a, a first side plate supporting portion 35b of which a proper path is downwardly curved into an insertion hole 33a from an end of the holder fixing portion 35a to curve a part of an end to an upper side to force an elastic force with respect to a sidewall of an insertion wall, a second side plate supporting portion 35c curvedly formed at a point separated from the first side plate supporting portion 35b to have the same shape as the first side plate supporting portion 35b, and an upper plate supporting portion 35d where a proper path is vertically curved into an insertion hole 33a at the point separated from the second side plate supporting portion 35c and horizontally curved again so as to pressurized the reflection panel 31a of the light tunnel 31.

The operations of the present invention with the above configuration now will be described.

First, the reflection panels 31a having a reflection mirror reflecting a light form a bonding portion 31b bonded by an adhesives to configure a light tunnel 31 with a square light shape. The bonding portion 31b is connected with the reflection panel 131a to form a third supporting member.

Next, the light tunnel 31 passes through a hardening process and is inserted in the reflection panel insertion hole 33a of the holder 33a, and the holder 33 is at a state that an optic axis is arranged to an optic engine base.

An insertion hole 33a of the holder 33 is manufactured to have a "U" shape so that the light tunnel 31 is positioned at a side edge of the insertion hole 33a and to pressurize a light tunnel 31 of the plate spring 35 at an upper portion to pressurize a light tunnel 31 of the plate spring 35 so that a side surface of the light tunnel 31 is pressurized to the side direction. In addition, the plate spring 35 is combined to be attachable/detachable using additional screw members at a sidewall of the insertion hole 33a.

The first and the second side plate supporting portions 35b and 35c are fixedly inserted at an interval between a sidewall surface (shown as a right surface in FIG. 3) of a light tunnel and a sidewall of the insertion hole 33a. At this time, a reflection panel 31a at an upper portion of a light tunnel 31 is pressurized downwardly by the upper plate supporting portion 35d curvedly formed at a point at a proper distance from the second side plate supporting portion 35c.

Furthermore, the first and the second side plate supporting portions 35b and 35c are manufactured to be perpendicular to the upper supporting portion 35d, thereby maintaining a corner portion being the weakest portion of a thermal modification to have a stable shape in spite of a high temperature. In other words, the plate spring 35 pressurizes the light tunnel 31, and the plate spring 35 is provided with a perpendicular shape, therefore the plate spring 35 pressurizes the light tunnel 31 with the original perpendicular shape and a corner portion of the light tunnel 31 maintains the originally provided perpendicular shape without any modifications.

In addition, it is desirable that a hole drilling portion 35e is formed with a proper depth at the holder fixing portion 35a between the second side plate supporting portion 35c and the upper plate supporting portion 35d in order to prevent a stress between the upper plate supporting portion 35e and the second side plate supporting portion 35c from being transmitted. A hole drilling portion 35f may be formed between the first side plate supporting portion 35b and the second side plate supporting portion 35c with the same reason.

The hole drilling portions 35e and 35f are formed so that the first side plate supporting portion 35b, the second side plate supporting portion 35c and the upper plate supporting portion 35d have an additional elastic force to pressurize a light tunnel 31 to each corresponding surface.

As described in the above embodiment, the plate spring 35 can pressurize the light tunnel 31 in not only a right and left direction but also an up and down direction as the second supporting member supporting a body of the light tunnel 31. Furthermore, the light tunnel 31 can be pressurized with a uniform pressurizing force, and the light tunnel 31 can be maintained at a corner portion where a temperature changes the most or a portion where a bonding portion is provided.

The light tunnel can provide with a uniform and safe surface light source at a state that modifications are not made even though a using time is lengthen by a plate spring having a shape and a structure. Of course, it is advantageous to improve an entire image quality and to improve the reliability of a product.

As described in the above embodiment, a configuration to firmly support a light tunnel by the third supporting member where the contact portions contact each other between the reflection panels consisting of a light tunnel and the second supporting member supporting a body of a light tunnel. However, a configuration of the first supporting member supporting an end of a light tunnel and a configuration of emitting a high temperature of a light tunnel will be described in detail in the below embodiments. It is apparent that the first supporting portion suggested below can be applicable in an embodiment related with the second supporting member and the third member suggested in the first embodiment.

THE SECOND EMBODIMENT

Figure 5:
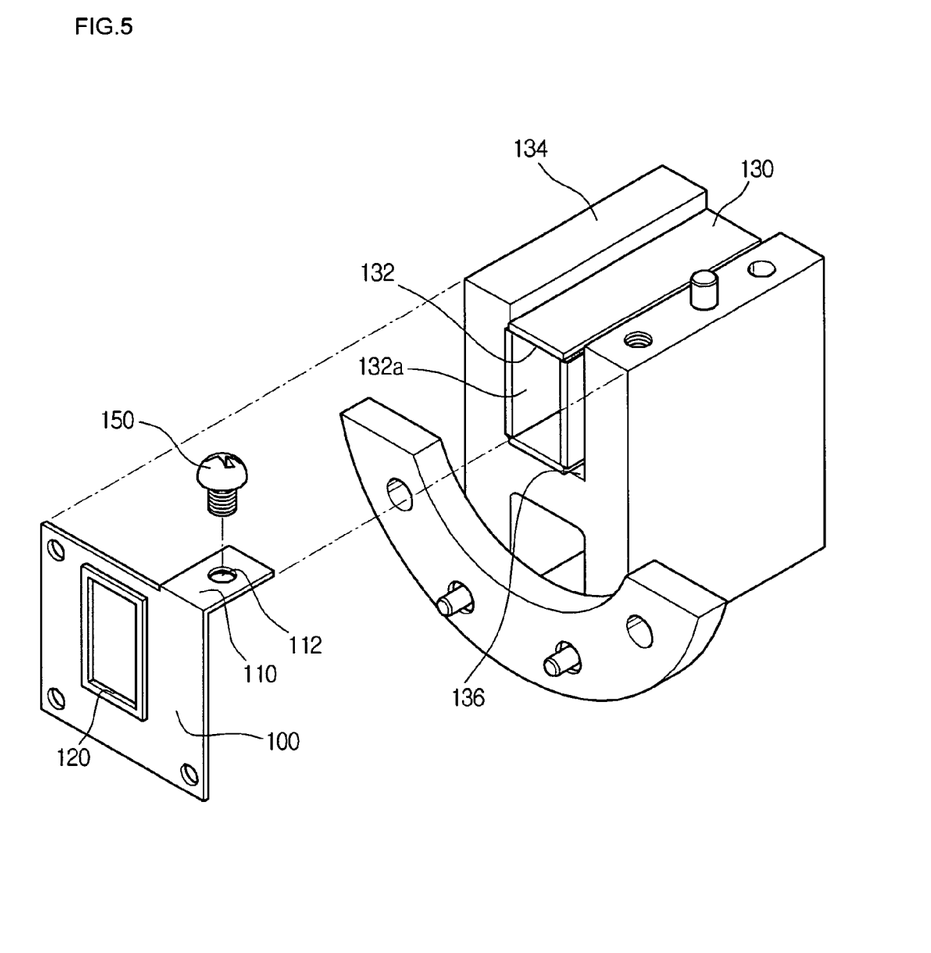
FIG. 5 is an underbody perspective view at a state that a fixing strip is disassembled in a light tunnel portion in accordance with the second embodiment in accordance with the present invention.
Figure 6:
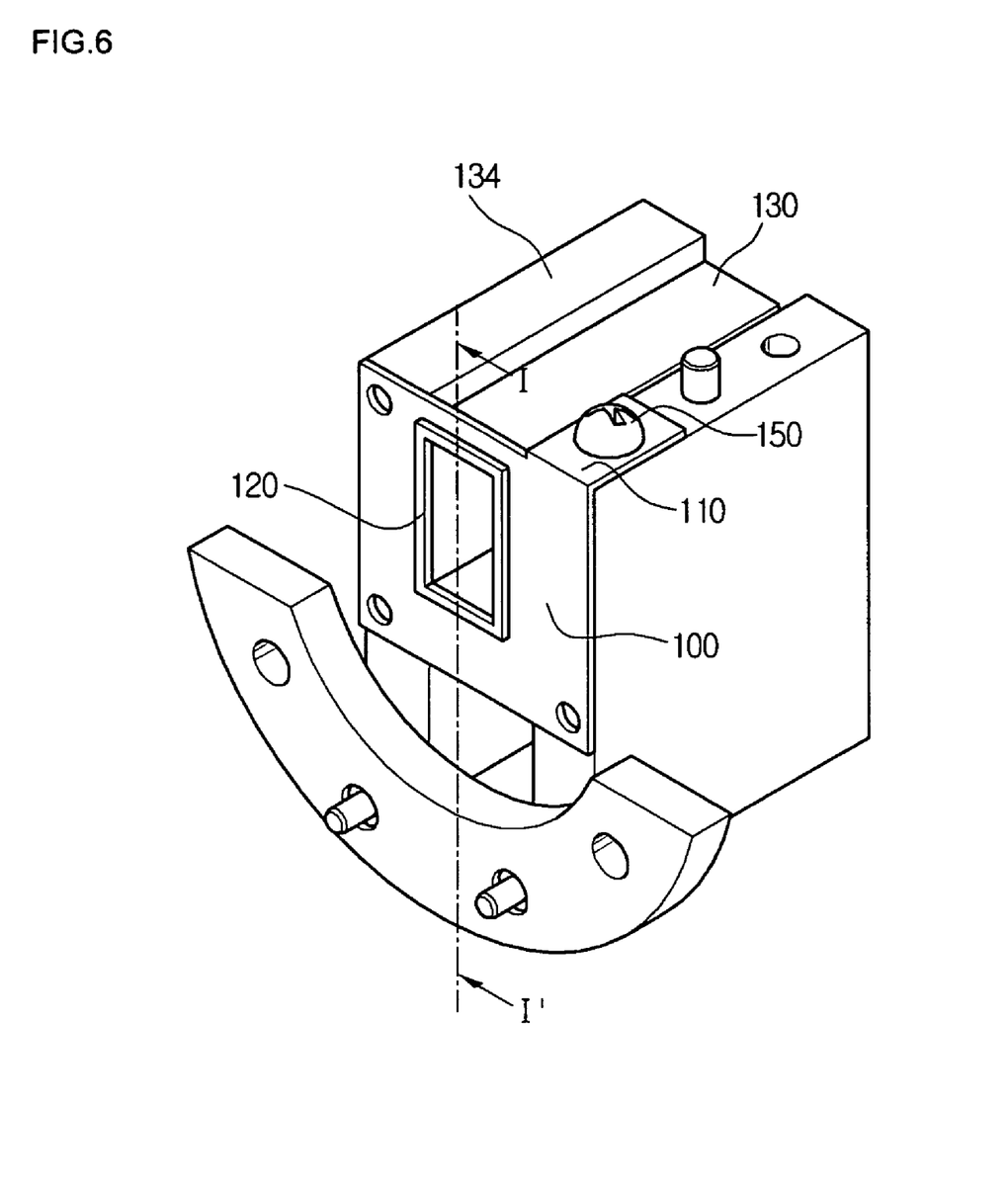
FIG. 6 is an underbody perspective view at a state that a fixing strip in accordance with the second embodiment of the present invention is mounted on a light tunnel portion.

FIG. 5 is an underbody perspective view at a state that a fixing strip is disassembled in a light tunnel portion in accordance with the present invention, and FIG. 6 is an underbody perspective view at a state that a fixing strip is installed at a light tunnel portion.

Referring to FIGS. 5 and 6, a light tunnel portion of a DLP projection system in accordance with the present embodiment includes: a light tunnel 130; a holder 134 to which the light tunnel is mounted to be fixed to an optical engine base; and a fixing strip 100 shielding a light impinged through the other portions except a light tunnel 130 out of a light impinged to the light tunnel 130.

The light tunnel forms a reflection panel 132 where a mirror having a reflection surface 132a is formed in order to make a light projected in the light tunnel reflected/refracted into a uniform surface light source. The size of the reflection panel 132 forms a very small shape with a length of 30 mm, a width of 6.2 mm, a height of 5.2 mm and a thickness of 0.5 mm.

The light tunnel 130 includes the reflection panel 132 at four edges so that a reflection surface 132a of the reflection panel 132 is formed at the inner four edges, and an end between the reflection panels is bonded to have an empty square pillar shape. In addition, an incidence portion for impinging a light irradiated in the lamp and an emitting portion where a light entered the incidence portion is refracted on the reflection surface to be projected to a color wheel are formed.

A holder 134 is included to mount the light tunnel 130 to an optic engine base 9 and the holder 134 includes an arrival surface 136 with a concave hole so that the light tunnel 130 is safely supported. An incidence portion where a light is impinged to a light tunnel 130 to fix the light tunnel 130 to a holder 134 includes a fixing strip 100, and the fixing strip 100 is closely adhered to a front surface of the holder 134 to which the light tunnel 130 arrives. Here, the fixing strip 100 is formed to have a wider area than at an outer side of the light tunnel 130, and an incidence opening 120 is formed to the fixing strip 100 to guide a front portion of a light tunnel 130.

Moreover, a curved extended strip 110 is extended from the fixing strip 100 to a side of a holder 134 to fix the fixing strip 100 and the holder 134 by a connecting member 150. The connecting member 150 is inserted in a screw hole (refer to 112 in FIG. 7) of a holder 134. Especially, a curved surface (refer to 122 in FIG. 7) is included in an incidence opening 120 equivalent to an external shape of a light tunnel 130 to the fixing strip 100, and a front portion of a light tunnel 130 may be insertedly supported in the incidence opening 120.

Figure 7:
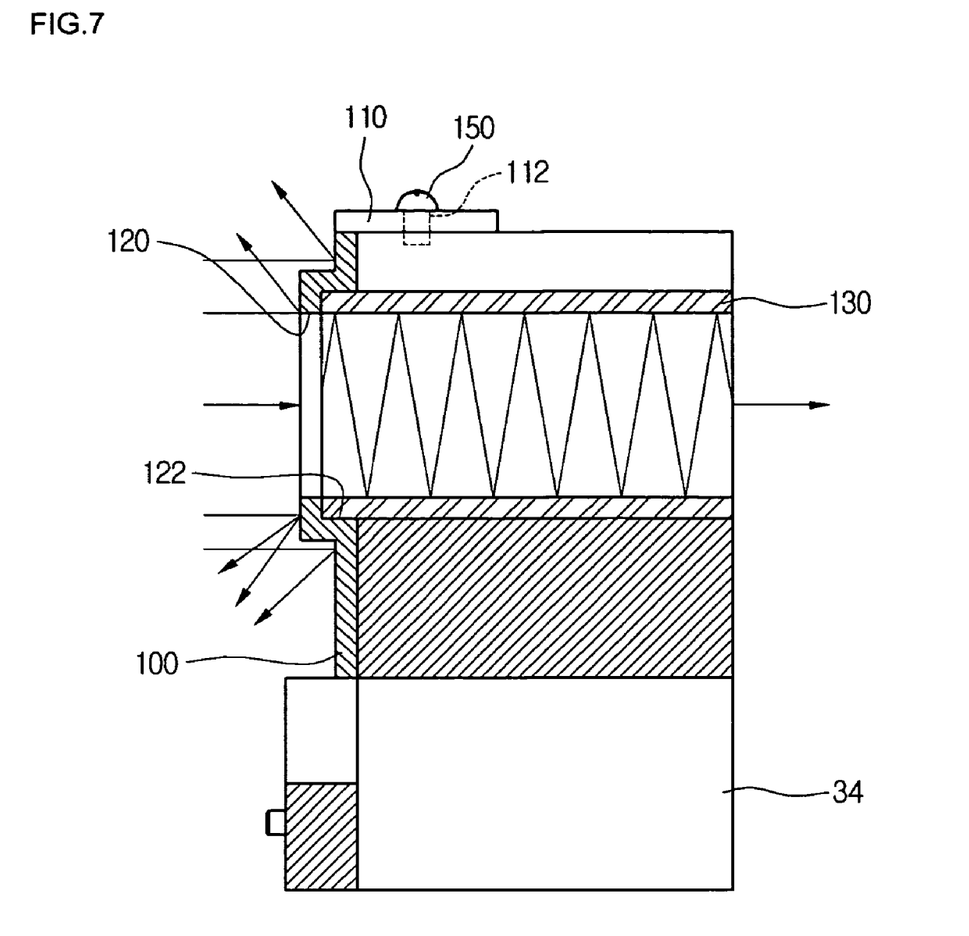
FIG. 7 is a cross-sectional view taken along the line I-I' in FIG. 6 in accordance with the present invention.

A fixing operation of the light tunnel now will be described with reference to a cross-sectional view of a line I-I' in FIG. 6 suggested in FIG. 7.

In order to shield a light impinged outwardly except an inner portion of a light tunnel 130 out of a light impinged from the lamp with stably supporting the light tunnel 130 to a holder 134, a fixing strip 100 is included on a front surface, or an incidence portion. The fixing strip 100 includes an incidence opening 120 having a shape corresponding to an external shape of a light tunnel 130 so that a light impinged from the lamp is impinged to the inner portion of a light tunnel 130 and shields a light impinged from the outside of the light tunnel 130. Therefore, a light impinged from the outside of a light tunnel 130 but not used can prevent a temperature from rising more or less.

In addition, the light tunnel 130 contacts a fixing strip 100 multilaterally to transmit a heat of the light tunnel 130 heated by a light of high temperature to the fixing strip 100. Furthermore, since a body of the fixing strip 100 and an extending strip 110 of the fixing strip 100 are closely adhered to the holder 134, a heat of the light tunnel 130 is transmitted to the holder 134 through the fixing strip 100 and an internal heat of the light tunnel 130 is rapidly let out to the outside. Due to this, it is advantageous that a temperature of the light tunnel 130 is uniformly distributed and a thermal burden is decreased due to an unequal heat of each part configuring a light tunnel.

In the meantime, in order to more effectively shield a light impinged to the fixing strip 100 of a light impinged to the light tunnel 130, an ultraviolet ray cutoff layer shielding an ultraviolet ray may be further comprised. The ultraviolet ray cutoff layer shields an ultraviolet ray of a light impinged to a fixing strip 100 to prevent the fixing strip 100 from being heated.

In the above embodiment, a structure of a light tunnel is more firmly strengthen by the first supporting member supporting an end of a light tunnel, a unnecessary light which is not impinged into the inside of a light tunnel and elevates a temperature of the light tunnel is shielded to rapidly emit an internal heat of the light tunnel through a fixing strip and prevent an unequal heat of a light tunnel. In this embodiment, it is apparent that an intensity of a light tunnel is more increased and a radiative function is rapidly performed.

THE THIRD EMBODIMENT

The third embodiment of the present invention describes that a fixing strip included at the front of the light tunnel in the second embodiment may be included at the rear of a light tunnel, and a heat of a light tunnel in the present embodiment is rapidly emitted forwardly and backwardly from the light tunnel through a fixing strip.

Figure 8:
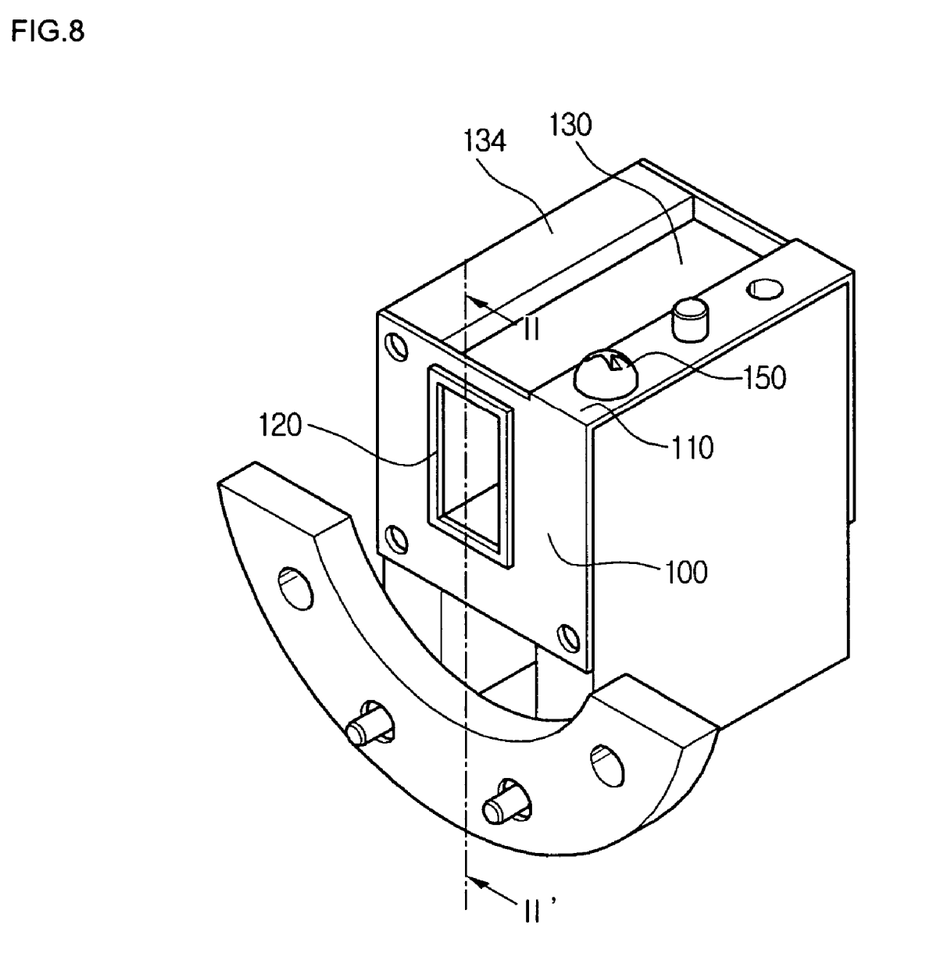
FIG. 8 is a underbody perspective view of a light tunnel in accordance with the third embodiment.
Figure 9:
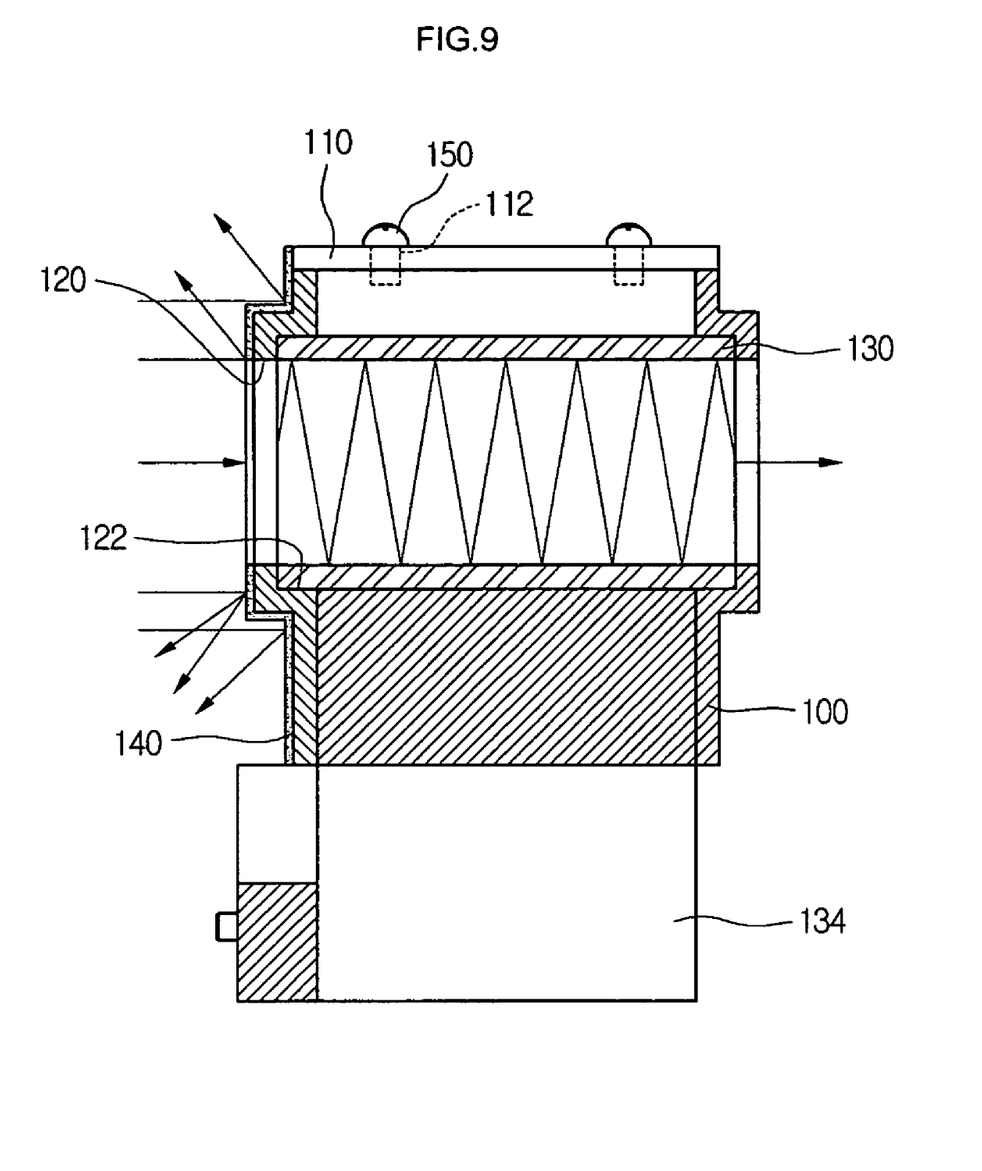
FIG. 9 is a cross-sectional view taken along the line I-I' in FIG. 8.

FIG. 8 is an underbody perspective view of a light tunnel in accordance with the third embodiment, and FIG. 9 is a cross-sectional view of the line I-I' in FIG. 8.

Referring to FIGS. 8 and 9, the light tunnel 130 arrives at an arrival surface 136 of a holder 134, a fixing strip 100 is extended to the front surface and the rear surface where a light is impinged and emitted, respectively, in order to fix the light tunnel 130 to the holder 134. The fixing strip 100 is closely adhered to a front surface and a rear surface of the holder 134 where a light tunnel 130 is mounted so that an emitting a heat is softly performed and a light tunnel 130 is firmly supported by a fixing strip 100.

The fixing strip 100 is formed to have a larger width than the width of the external part, and a front portion and a rear portion of a light tunnel 130 is insertedly supported with a regular width at the fixing strip 100 to form an incidence opening 120 identical to the end. In addition, the incidence opening 120 has a curved surface 122 formed to be insertedly supported outwardly of the light tunnel 130, so that an inner surface of the fixing strip 100 is equal to the outer surface of the light tunnel 130. In addition, a fixing strip 100 on the front surface and an extending strip 110 connecting the fixing strip 100 at the rear surface is fixed to the holder 134 by a connecting member 150 at a side of the holder 134 and a screw hole 112.

In addition, as described in the description of the second embodiment, a fixing strip 100 comprised on the front surface of the light tunnel 130 may be further provided with an ultraviolet ray cutoff layer 140. The biggest reason of raising a temperature is based on an ultraviolet ray out of a light impinged to a light tunnel 130 from a lamp. An ultraviolet ray which is not filtered by an ultraviolet ray cutoff filter between a lamp and a light tunnel 130 but included in a light impinged to the light tunnel 130 is filtered again by an ultraviolet ray cutoff layer 140 of a fixing strip 100 included on a front surface of the light tunnel 130 to restrain a temperature in the light tunnel from rising. In order to obtain this, it is desirable that the ultraviolet ray cutoff layer 140 is provided to an opening of the incidence of the light tunnel 130. Of course, since an ultraviolet ray impinged by the ultraviolet cutoff layer 140 is shielded in the holder 134, the ultraviolet ray included in the incidence light is not operated as a heating source with respect to the holder 134. Therefore, it is advantageous to prevent a temperature of the holder 134 and the light tunnel 130 from rising.

Since the front and the rear of the light tunnel 130 are supported by the first supporting member corresponding to the fixing strip 100, it is advantageous that the light tunnel 130 maintains the structure more firmly. In addition, since an ultraviolet ray is prevented from being impinged to an ultraviolet ray cutoff layer, it is advantageous that a temperature of a holder and a light tunnel is prevented from rising.

In the second and the third embodiments, a first supporting member supporting a front portion and a rear portion of a light tunnel has a structure supporting the light tunnel as an additional goods. However, it is not desirable that the light tunnel is supported by additional goods in an aspect that raising the manufacture costs is required. The other embodiments improving problems in the embodiments now will be suggested in other embodiments.

THE FOURTH EMBODIMENT

As described above, the present embodiment is the same as the embodiment suggested in many portions, but a configuration of the first supporting member supporting a front and a rear of a light tunnel is specially changed.

Figure 10:
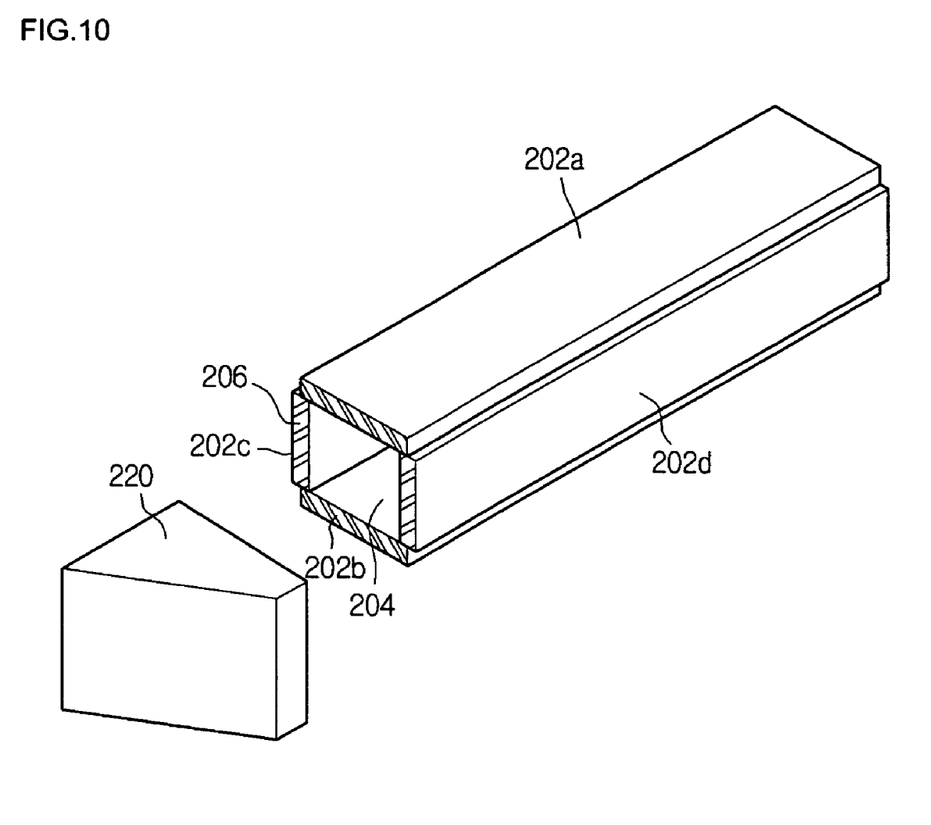
FIG. 10 is a disassembled perspective view of a light tunnel in accordance with the fourth embodiment of the present invention.
Figure 11:
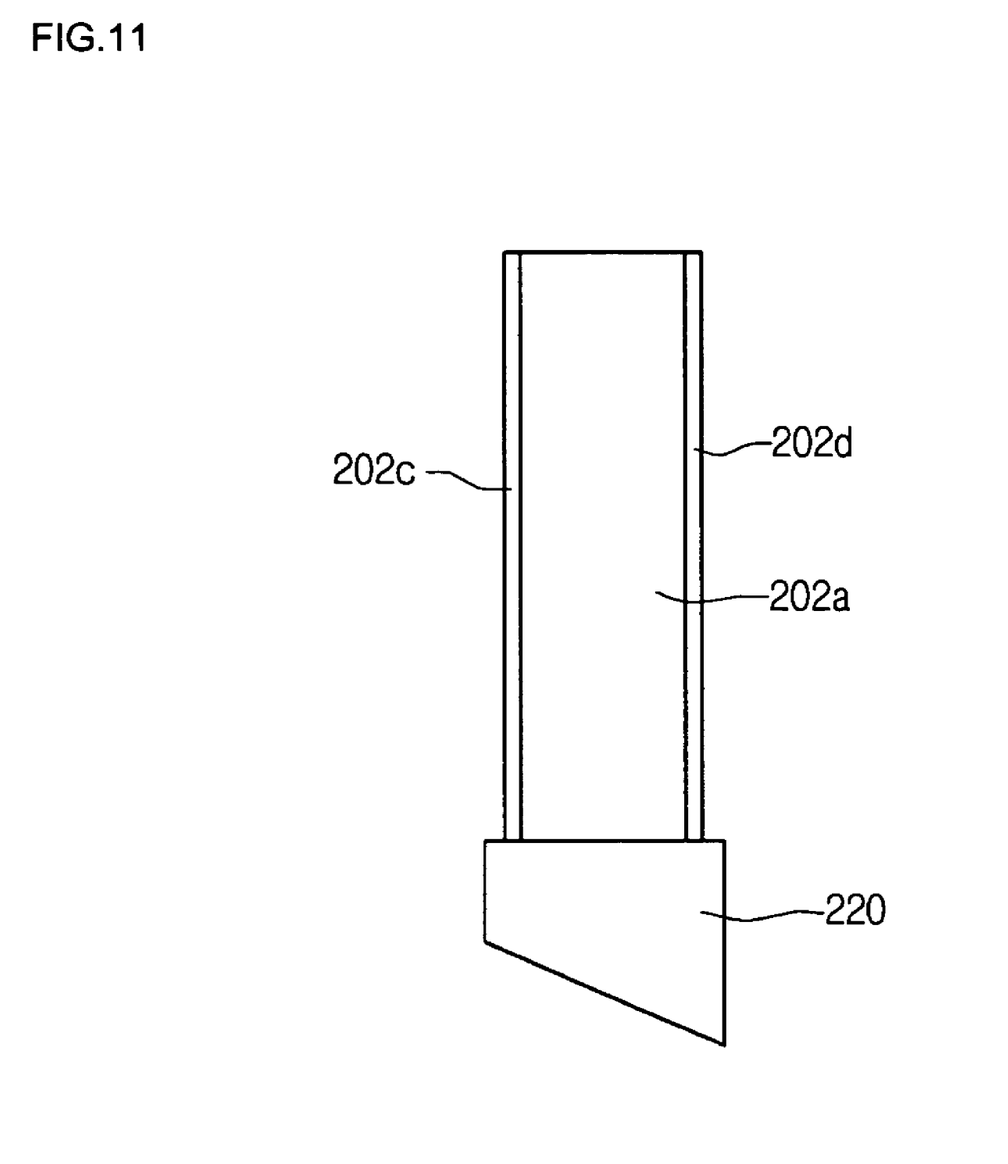
FIG. 11 is a plan view of a light tunnel in accordance with the fourth embodiment of the present invention.

FIG. 10 is a disassembled perspective view of a light tunnel in accordance with the present invention, and FIG. 11 is a plan view of a light tunnel in accordance with the present invention.

Referring to FIGS. 10 and 11, the light tunnel is provided with a reflection panel 202a~202d, referred to as 2020, hereinafter) having a reflection surface 204, and an ultraviolet ray filter 220 is further fixed at the front of the reflection panel 202. The ultraviolet ray filter 220 is the same goods as an ultraviolet ray filter 2 as described above in FIG. 1, and is a part filtering an ultraviolet ray in the light generated from a lamp to restrain a temperature of a light tunnel from rising.

The ultraviolet ray filter 220 is fixed at the front portion of the light tunnel to improve an intensity of the light tunnel. The ultraviolet ray filter 220 is formed to reinforce that an intensity is weaken by the first supporting member by the contact with the reflection panel 202.

In addition, since the ultraviolet ray filter 220 is to shield an ultraviolet ray used as suggested in FIG. 1 with a purpose for reinforcing an intensity of a light tunnel, it is not called an additionally necessary goods to reinforce an intensity of a light tunnel.

In detail, the ultraviolet ray filter 220 has a prism shape so that an ultraviolet ray is not impinged to a light tunnel, especially, an incidence portion placed at the bottom surface with the prism shape and at the front portion of the light tunnel is bondedly supported to maintain a light tunnel more stably. Moreover, since the upper reflection panel 202a and the lower reflection panel 202b and the left reflection panel 202c and the right reflection panel 202d are entirely connected on the inner surface of the ultraviolet filter 220, the present invention is advantageous in that the intensity of a light tunnel is more increased.

In addition, since the front surface of the light tunnel is blocked, a possibility of an inflow of bows into the light tunnel is more decreased and the light transmitted through the light tunnel loses obstacles to decrease the bows in the light path. Therefore, a capability of surface light is more improved. In accordance with the above embodiment, a role of the first supporting member supporting an end of a light tunnel is performed by an ultraviolet ray filter required in a DLP projection system, and the present invention is advantageous in that no additional goods are required in order to increase an intensity of a light tunnel.

In the meantime, the present invention has a shortcoming that the manufacturing process becomes complicated in a case that the light tunnel is bonded to the ultraviolet ray filter by an adhesiveness, and the other embodiments will be described in order to overcome the problem.

THE FIFTH EMBODIMENT

Figure 12:
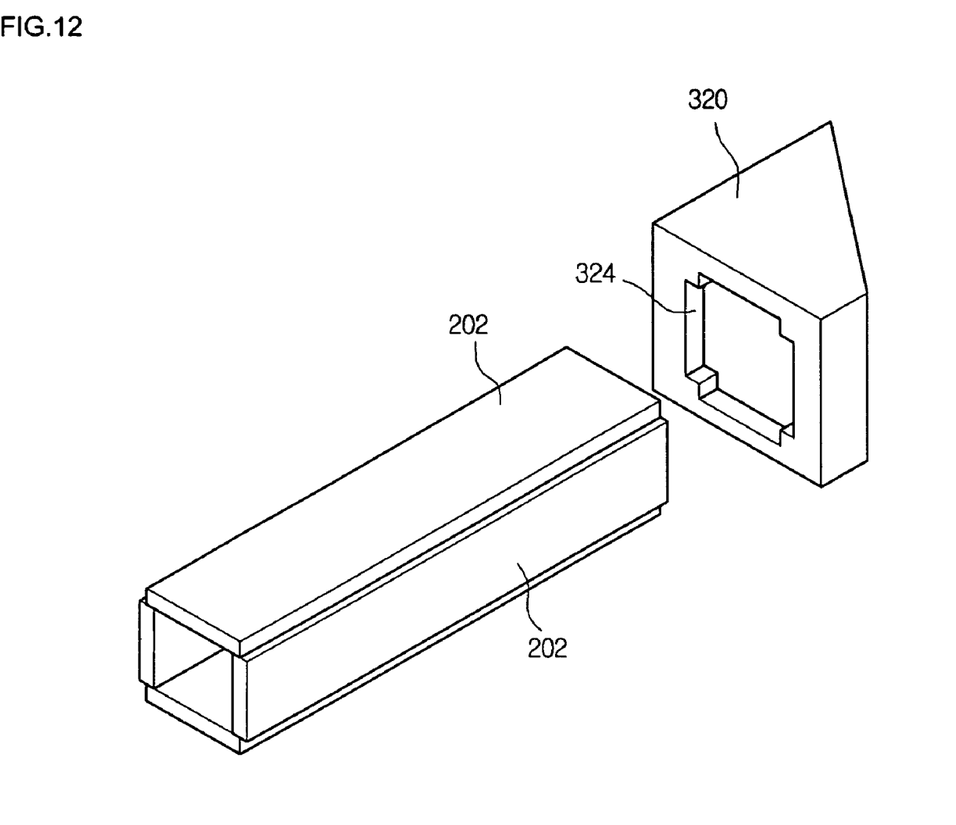
FIG. 12 is a disassembled perspective view of a light tunnel in accordance with the fifth embodiment of the present invention.

FIG. 12 is a disassembled perspective view of a light tunnel in accordance with the fifth embodiment.

Referring to FIG. 12, an ultraviolet filter 320 is inserted at an end of the light tunnel. A depressed fixing hole 324 is formed on the corresponding surface of the ultraviolet ray filter 320 contact with the light tunnel to be adjusted to a horizontal and a vertical lengths, and an incidence portion being a front portion of the light tunnel is fixedly inserted in the inside of the fixing hole 324.

It is natural that the fixing hole 324 formed on the ultraviolet ray filter 320 has the reflection filter 202 so that a light projected in the lamp is not let out. It is natural that a light tunnel maintains an original shape more firmly by the present embodiment.

THE SIXTH EMBODIMENT

Figure 13:
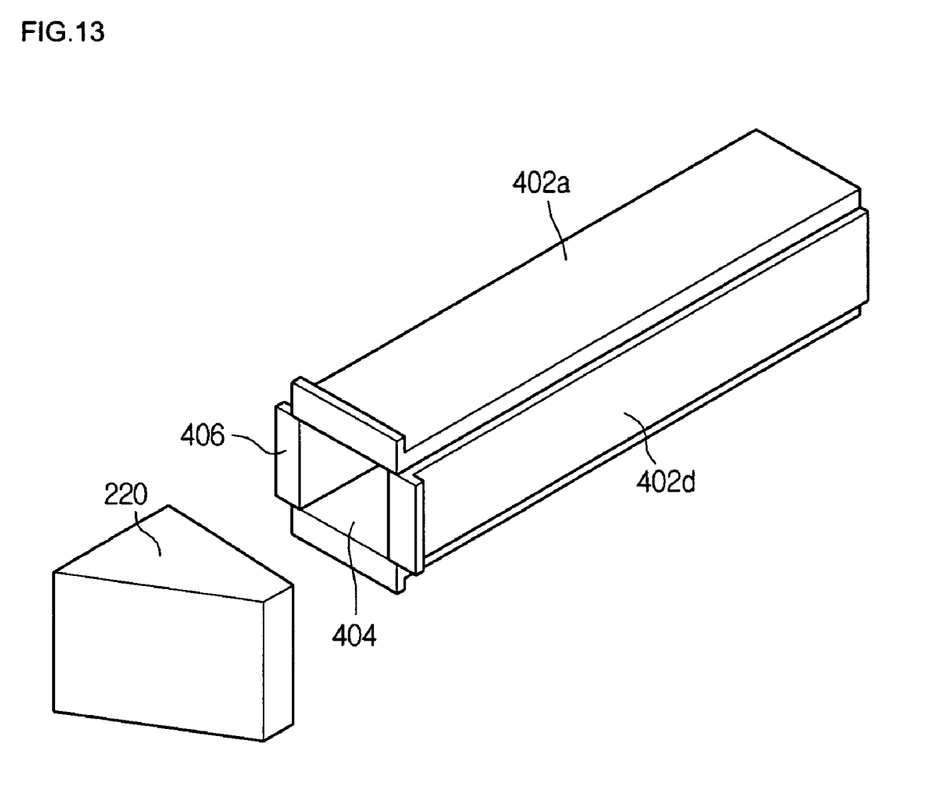
FIG. 13 is a disassembled perspective view of a light tunnel in accordance with the sixth embodiment of the present invention.

FIG. 13 is a disassembled perspective view of a light tunnel in accordance with the present embodiment.

Referring to FIG. 13, an extension portion 406 is formed to extend a contact surface at the front portion of the light tunnel, in other words, at the front portion of a reflection panel 402 bonded to an ultraviolet filter 220.

As shown in the above-mentioned embodiments, if the extension portion 406 is formed on the reflection panel 402, an area of a light tunnel contacting with the ultraviolet ray filter 220 increases, a wider and more stable supporting area can be secured and the fixing the ultraviolet ray filter 220 with a light tunnel become more firm.

Of course, the present embodiment has various effects obtained as suggested in the description of the fourth embodiment.

As described above, an intensity of a light tunnel in a DLP project system in accordance with the present invention is improved, a radiative function of a light tunnel is effectively performed, a manufacture is conveniently performed, a cost becomes low, a capability of a surface light is improved by a light tunnel, and a system is stably operated.

What is claimed is:

1. A light tunnel of a Digital Light Processing (DLP) projection system comprising:
    a plurality of reflection panels provided with a light transmitting space;
    a holder having an insertion hole where the reflection panels are placed; and
    a plate spring supporting a body of the reflection panels, wherein the plate spring comprises:
        a holder fixing portion connected with an upper end of a side of the insertion hole,
        a side plate supporting portion formed at an end of the holder fixing portion, and the side plate supporting portion configured to be fixed to an upper side of the holder to pressurize a side of one of the reflection panels with respect to the holder; and
        an upper plate supporting portion formed to be perpendicular to the side plate supporting portion, and the upper plate supporting portion configured to press an upper one of the reflection panels.

2. The light tunnel of a Digital Light Processing (DLP) projection system of claim 1, wherein a contact portion between the reflection panels are bonded to form a bonding portion.

3. The light tunnel of a Digital Light Processing (DLP) projection system of claim 1, wherein a contact portion with the reflection panels is connected with the ends of the reflection panels so that a light is not let out through openings formed at ends of the light tunnel.

4. The light tunnel of a Digital Light Processing (DLP) projection system of claim 1, further comprising a first supporting member formed on an incidence portion of the reflection panels.

5. The light tunnel of a Digital Light Processing (DLP) projection system of claim 1, further comprising a second supporting member which is the plate spring supporting the plurality of reflection panels.

6. The light tunnel of a Digital Light Processing (DLP) projection system of claim 5, wherein the plate spring supports an upper direction and a side of the reflection panels.

7. The light tunnel of a Digital Light Processing (IDLP) projection system of claim 5, wherein the plate spring is fixed to the holder.

8. The light tunnel of a Digital Light Processing (DLP) projection system of claim 1, further comprising a hole drilling portion for preventing a stress from being transmitted, the hole drilling portion formed between the side plate supporting portion and the upper plate supporting portion.

9. A light tunnel of a Digital Light Processing (DLP) projection system comprising:
    a plurality of reflection panels connected with each other;
    a holder having an insertion hole where the reflection panels are provided;
    an incidence portion to receive a light inside of the reflection panels;
    an emitting portion to emit the light after being reflected by the reflection panels; and a plate spring elastically supporting some of the plurality of reflection panels, wherein the plate spring comprises:

a holder fixing portion connected with an upper end of a side of the insertion hole, a side plate supporting portion formed at an end of the holder fixing portion, and the side plate supporting portion configured to be fixed to an upper side of the holder to pressurize a side of one of the reflection panels with respect to the holder, and an upper plate supporting portion formed to be perpendicular to the side plate supporting portion, and the upper plate supporting portion configured to press an upper one of the reflection panels.

10. The light tunnel of claim 9, further comprising a hole drilling portion for preventing a stress from being transmitted, the hole drilling portion formed between the side plate supporting portion and the upper plate supporting portion.

11. The light tunnel of claim 9, wherein at least one of the reflection panels is applied to an inner surface of the holder.

* * * * *